Figure 3:
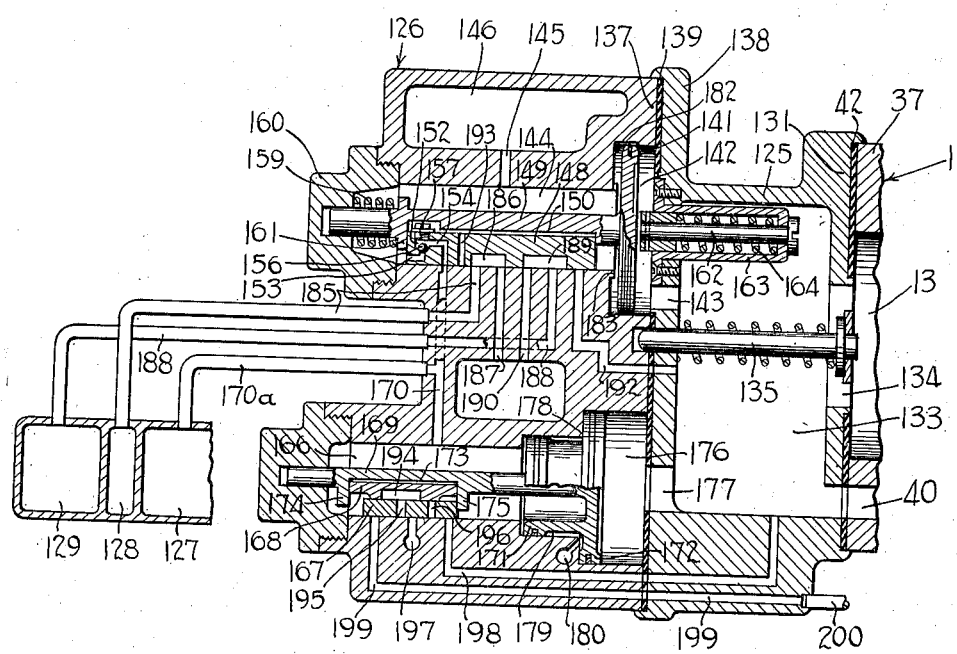

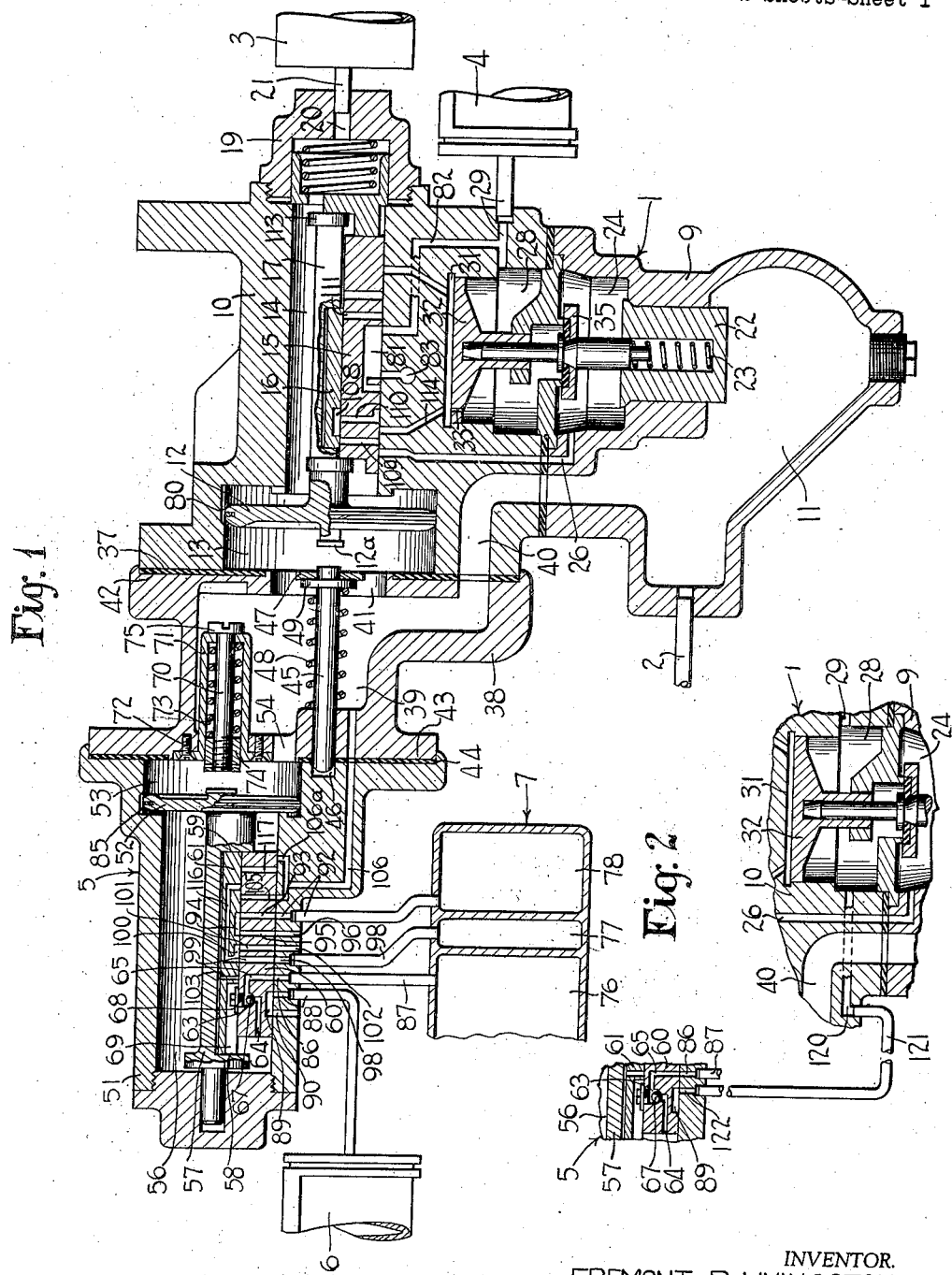

Patented July 27, 1937

2,088,066

UNITED STATES PATENT OFFICE 2,088,066

FLUID PRESSURE BRAKE

Fremont P. Livingston, Denver, Colo., assignor to The Westinghouse Air Brake Company, Wilmerding, Pa., a corporation of Pennsylvania Application September 10, 1936, Serial No. 100,079

16 Claims. (Cl. 303—43)

This invention relates to fluid pressure brakes, and more particularly to the type operative upon a reduction in the pressure of fluid in a brake pipe to effect an application of the brakes.

In order to ensure adequate and safe control of the brakes on a long train operated under present day service conditions, it is desirable that the braking means be designed to effect the application of the brakes rapidly and uniformly throughout the train, and that the braking means be at all times capable of effecting an emergency application of the brakes upon a predetermined reduction in brake pipe pressure to a given degree, regardless of prior service applications or of the rate of reduction in brake pipe pressure.

In controlling the brakes on a long train made up of cars equipped with the old standard K triple valves, it is apt to be difficult to effect a sufficiently rapid service application of the brakes throughout the train, due in part to the fact that the quick service venting of fluid from the brake pipe by the K triple valves on a long train is sometimes inadequate to ensure rapid propagation of the service reduction in brake pipe pressure to the rear of the train.

One object of my invention is to provide means adapted to be associated with a triple valve device of the K type to obviate the above difficulty.

Another object of the invention is to provide an emergency valve means adapted for association with a K triple valve, and which emergency valve means is always operative upon a reduction in brake pipe pressure to an emergency degree to effect an emergency application of the brakes, regardless of previous service applications.

Another object of my invention is to provide an emergency valve device adapted for association with a triple valve, which emergency valve device is operative independently of the triple valve to supply fluid under pressure from an emergency reservoir to the brake cylinder only when the pressure of fluid in the brake pipe is reduced to a predetermined degree, and which device is at the same time operative to vent fluid under pressure locally from the brake pipe for propagating serial quick action throughout the train.

A further object of the invention is to provide an emergency valve device of the above type embodying improved means for controlling the charging of the emergency reservoir.

A still further object is to provide an emergency valve device having release, quick service, and emergency positions, with means for stabilizing operation of said device in the quick service position and for facilitating movement to the release position.

Other objects and advantages of the invention will be apparent in the following more detailed description thereof, taken with reference to the accompanying drawings, wherein:

Fig. 1 is a diagrammatic view, mainly in section, of a fluid pressure brake equipment embodying my invention; Fig. 2 is a fragmentary sectional view of a modification of the equipment shown in Fig. 1; and Fig. 3 is a diagrammatic sectional view of a fluid pressure brake equipment embodying a modified form of my invention.

Referring to Fig. 1 of the drawings, there is provided a triple valve device 1, a brake pipe 2, an auxiliary reservoir 3, a brake cylinder 4, an emergency valve device 5, an emergency brake cylinder 6, and a chambered reservoir unit 7. The emergency brake cylinder 6 is adapted to be operated in addition to the brake cylinder 4 in effecting an emergency application of the brakes.

The triple valve device 1, illustrated in Fig. 1, is of the well known K type, and comprises a casing section 9 having a chamber 11 connected to the brake pipe 2, and a casing section 10 having a bore within which is slidably mounted a piston 12, forming at one side a piston chamber 13, and at the other side a valve chamber 14 which contains a main slide valve 15 and a graduating slide valve 16, both slide valves being controlled by the piston through the medium of a valve stem 17. A cap 19 having screw threaded connection with the casing section 10 is provided for closing the outer end of the valve chamber 14, which is connected through a passage 20 in the cap and a pipe 21 with the auxiliary reservoir 3.

The usual check valve 22 is mounted in a bore in the casing section 9 and urged toward its seat by a spring 23 for controlling communication between the chamber 11 and a chamber 24 above the check valve, the chamber 24 being connected to a passage 26 leading to the seat of the main slide valve 15. Formed in the casing section 10 is a chamber 28 connected by way of a passage and pipe 29 to the brake cylinder 4, and separated from a chamber 31 by an emergency piston 32, which piston may have a loose fit in its bore or have a small passage 33 for providing restricted communication between the chambers 28 and 31.

Although, for the purpose of illustration, the triple valve device 1 is shown as including the usual emergency valve 35 adapted to be controlled by the emergency piston 32, it is to be understood that, as will be hereinafter explained, the triple valve device as embodied in my invention is rendered inoperative to effect an emergency application of the brakes, this function being performed by the emergency valve device 5 presently to be described.

Secured by bolts (not shown) to the flange 37 formed on the triple valve casing 10 is a casing section 38, which has a chamber 39 communicating through a passage 40 with the chamber 11 and which is open to the piston chamber 13 in the triple valve device by way of an aperture 41 formed in the casing section 38. A suitable gasket 42 is interposed between the casing section 38 and the triple valve flange 37 for ensuring a tight joint. The casing section 38 is provided with a flange 43 adapted to carry the casing of the emergency valve device 5 which may be secured thereto by means of bolts (not shown), a sealing gasket 44 being provided between said casing sections.

In order to prevent movement of the triple valve piston 12 to the usual emergency position, there is provided a stem 45 engageable by the piston after movement thereof to the service position. One end of the stem 45 is mounted in a bore in the casing section 38 and is normally slightly spaced from the wall of a depression 46 formed in the emergency valve casing, and the other end of the stem extends through a perforate web 47 formed across the aperture 41 and is aligned with the central boss 12a of the triple valve piston. A spring 48 is interposed between the wall of chamber 39 and a collar 49 of the stem 45 for providing the desired resistance to movement of the triple valve piston 12 into the full service position.

The emergency valve device 5 comprises a casing 51 having a bore in which is mounted an emergency piston 52 which has at one side a piston chamber 53 open by way of an aperture 54 to the chamber 39 of the casing section 38, and which piston forms at the opposite side a valve chamber 56. The emergency piston has a stem 57 extending into the valve chamber 56, on which stem are formed offset shoulders 58 and 59, the shoulder 59 engaging one end of a slide valve 60 in release position of the piston 52 and the shoulder 58 being adapted to engage the opposite end of the valve upon a predetermined movement of the stem 57 relative to the valve 60. Seated on the slide valve 60 is an auxiliary slide valve 61, the ends of which engage both shoulders, so that said valve 61 always moves with the stem.

Formed within the emergency slide valve 60 is a valve chamber 63 communicating by way of a passage 64 with the chamber 56 and connected to a port 65 which leads to the seat of the emergency slide valve. The port 65 is in one position of the slide valve 60 adapted to register with a passage 86 connected by way of a pipe 87 with the emergency reservoir 76, and a ball check valve 67 is disposed in the valve chamber 63 for preventing back flow of fluid under pressure from the reservoir to the chamber 56. A plug 68 has screw threaded connection with the slide valve 60 for closing the valve chamber 63, and the auxiliary slide valve 61 has a suitable recess 69 for clearing the head of the plug.

Yielding stop means is provided for resisting movement of the emergency piston 52 from the service position thereof to the emergency position, the stop means comprising a plunger 70 slidably mounted in a cage 71 that is mounted within the casing section 38 and is secured in place by means of screws 72. The plunger 70 is aligned for engagement by the piston 52, and is subject to the force of a spring 73 interposed between a nut 74 screwed on said plunger and the end of the cage 71, the plunger head 75 limiting the extent of movement of the plunger as effected by the spring.

The reservoir unit 7 is divided into compartments comprising an emergency reservoir 76, a stabilizing bulb 77, and a quick service chamber 78, the functions of which will be apparent from the following description of the operation of the fluid pressure brake equipment.

In initially charging the fluid pressure brake system, fluid under pressure is supplied in the usual manner through the brake pipe 2 to the chamber 11 of the triple valve device 1, and flows thence through the passage 40, chamber 39 and aperture 41 to the triple valve piston chamber 13, and also flows from the chamber 39 through the aperture 54 to the emergency piston chamber 53. At the same time fluid under pressure in the chamber 11 unseats and flows past the check valve 22 to charge the chamber 24.

Fluid under pressure thus supplied to the piston chamber 13 moves the piston 12 to the release position shown in Fig. 1 and flows past the piston by way of the usual feed groove 80 to the valve chamber 14 and thence through the passage 20 and pipe 21 to the auxiliary reservoir 3, charging said reservoir. With the triple valve parts in the release position, a cavity 81 in the main slide valve 15 connects a passage 82 communicating with the brake cylinder passage 29 to an exhaust port 83, so that the brake cylinder 4 is vented to the atmosphere.

Fluid under pressure in the chamber 53 of the emergency valve device 5 causes movement of the emergency piston 52 to shift the slide valves 61 and 60 to the release position as shown in the drawings and then flows past said piston by way of a feed groove 85 to the valve chamber 56. With the emergency slide valve in release position the port 65 therein registers with a passage 86 which is connected through a pipe 87 with the emergency reservoir 76, so that fluid under pressure is supplied from the valve chamber 56 through the passage 64, past the ball check valve 67, and through valve chamber 63, port 65, passage 86 and pipe 87 to charge the emergency reservoir.

The emergency brake cylinder 6 is connected in the release position of the emergency valve device by way of a pipe and passage 88 and a cavity 89 in the emergency slide valve 60 with an atmospheric exhaust port 90. Similarly, the quick service chamber 78 is connected to atmosphere by way of a pipe and passage 92, a port 93 in the emergency slide valve, a cavity 94 in the auxiliary slide valve, a port 95 in said emergency slide valve and an exhaust port 96, while the stabilizing bulb 77 is vented through a pipe and passage 98, an emergency slide valve port 99, a cavity 100 in the auxiliary slide valve, and a port 101 registering with an atmospheric exhaust port 102.

If it is desired to effect a service application of the brakes, fluid under pressure is vented at a service rate from the brake pipe 2 in the customary manner through the medium of the usual engineer's brake valve (not shown), thereby causing the venting of fluid under pressure from the chamber 39 and the connected emergency piston chamber 53 and triple valve piston chamber 13, by way of the passage 40 and chamber 11 communicating with the brake pipe.

Upon the reduction in the pressure of fluid in the chamber 53 of the emergency valve device 5, the fluid under pressure in the valve chamber 56 moves the emergency piston 52 toward the right, as viewed in Fig. 1, thereby causing said piston to close the feed groove 85 and to move the stem 57 for shifting the auxiliary slide valve 61 in the same direction relative to the emergency slide valve 60.

As the auxiliary slide valve 61 is thus moved into the quick service position, the connection between the bulb 77 and atmosphere is cut off, while a restricted port 103 in said slide valve registers with the port 99 in the emergency slide valve 60, whereupon fluid under pressure is quickly vented from the valve chamber 56 through the port 103, port 99, and passage and pipe 98 to the stabilizing bulb 77. The ball check valve 67 is, of course, effective to prevent escape of fluid under pressure from the emergency reservoir 76 by back flow through the port 65 and passage 64 in the slide valve 60 to the chamber 56.

The quick reduction of the fluid pressure in the valve chamber 56 thus caused by equalization of the fluid pressure in said chamber into the bulb 77 tends to check further movement of the emergency piston 52, which at substantially the same time is adapted to engage the plunger 70, so that the spring 73 is then effective to resist movement of said piston from the quick service position.

With the emergency valve device in the quick service position, the connection between the cavity 94 in the auxiliary slide valve 61 and the atmosphere is lapped and said cavity is now arranged to establish communication between the passage 93 and a passage 105 in the emergency slide valve 60, which passage 105 registers with a brake pipe passage 106 connected to the chamber 39 in the casing section 38. Fluid under pressure is thereby vented at a quick service rate from the brake pipe 2 by way of the chamber 11, passage 40, chamber 39, passage 106, port 105, cavity 94, port 93 and the passage and pipe 92 to the quick service chamber 78 thereby effecting a limited local quick service reduction in brake pipe pressure.

Meanwhile, upon the reduction in the pressure of fluid in the brake pipe as already described, the consequent reduction in the fluid pressure in the triple valve piston chamber 13 causes the fluid pressure in the valve chamber 14 to move the piston 12 to the left, as viewed in the drawings, thereby closing the feed groove 80 and shifting the graduating slide valve 16 relative to the main slide valve 15 through the medium of the stem 17. This movement of the graduating slide valve 16 causes a cavity 108 therein to connect ports 109 and 110 in the main slide valve 15, and also uncovers a service port 111 in the main slide valve.

Continued movement of the piston 12 brings a collar 113 on the stem 17 into engagement with the main slide valve 15, so that both slide valves are then moved together into the service position thereof, in which the service port 111 partially registers with the brake cylinder passage 82, while the ports 109 and 110 register respectively with the passage 26 and a passage 114 connected to the chamber 31. Fluid under pressure is thereby permitted to flow at an initially slow rate from the auxiliary reservoir 3 through the pipe 21, passage 20, valve chamber 14, port 111 in the main slide valve 15, passage 82 and passage and pipe 29 to the brake cylinder 4.

At the same time, fluid under pressure is discharged from the chamber 24 by way of the connected passages and slide valve ports 26, 109, 108, 110, and 114, and through the chamber 31, restricted port 33 in the piston 32 and chamber 28 to the brake cylinder passage 29, the rate of flow through said communications being such as to prevent the fluid pressure in the chamber 31 from moving the piston 32. The consequent reduction in the fluid pressure in the chamber 24 then permits fluid at brake pipe pressure in chamber 11 to unseat the check valve 22, whereupon fluid under pressure is vented from the brake pipe 2 through the chamber 11, past the check valve and through the quick service communications above mentioned to the brake cylinder.

The local reduction in brake pipe pressure thus effected by quick service operation of the triple valve device 1 acts to augment the initial quick service reduction effected by the emergency valve device 5, it being understood that the movement of the auxiliary slide valve 61 to its service position will generally be accomplished before movement of the triple valve slide valves 16 and 15 to quick service position due to the comparatively light frictional resistance offered by the valve 61.

If the rate of reduction in brake pipe pressure is sufficiently rapid, as on cars near the head end of the train, the triple valve piston 12 is moved into full service, overcoming the spring 48. In the full service position of the triple valve device 1, the service port 111 is fully open to the brake cylinder passage 82, so that fluid under pressure will continue to flow at a more rapid rate from the auxiliary reservoir 3 by way of the valve chamber 14 to the brake cylinder 4 for effecting the service application of the brakes. The main slide valve 15, in its traverse from quick service to full service position, is operative to lap the passage 26, thereby preventing further quick service venting of fluid under pressure from the brake pipe to the brake cylinder.

As the fluid pressure in the auxiliary reservoir 3 is reduced, by flow of fluid therefrom to the brake cylinder 4, to a pressure slightly less than that of fluid in the piston chamber 13, the piston 12 is moved toward the right hand so as to shift the graduating slide valve 16 relative to the main slide valve 15 into service lap position, wherein the graduating slide valve laps the service port 111, thus cutting off further supply of fluid under pressure from the auxiliary reservoir to the brake cylinder 4.

To release the brakes following the service application just described, fluid under pressure is supplied in the usual manner to the brake pipe 2 and thence by way of the chamber 11, passage 40 and chamber 39 to the emergency piston chamber 53 and the triple valve piston chamber 13.

The fluid pressure in the valve chamber 56 having been reduced by equalization with that in the bulb 77, upon the increase in the pressure of fluid in the piston chamber 53, the emergency piston 85 and the auxiliary slide valve 61 are readily moved from the service position to the release position, as shown in Fig. 1 of the drawings, whereby the quick service chamber 78 and the bulb 77 are again connected to the atmosphere in the manner already described.

Simlarly, the increase in the pressure of fluid in the piston chamber 13 of the triple valve device 1 effects movement of the piston 12 to the right as viewed in the drawings, the stem 17 being thus operated to shift the slide valves 16 and 15 to the release position, wherein the brake cylinder 4 is again connected through the pipe and passage 29, passage 82 and cavity 81 to the atmospheric exhaust port 83, thereby effecting the release of the brakes.

If it is desired to effect an emergency application of the brakes, fluid under pressure is vented from the brake pipe 2 at an emergency rate, causing a resultant reduction of fluid pressure at the emergency rate in the piston chambers 13 and 53. The piston 12 is then moved by the fluid pressure in the valve chamber 14 to the full service position, further movement being prevented when the boss 12a on the piston engages the end of the stem 45. The triple valve device 1 is thus operated to effect the supply of fluid under pressure from the auxiliary reservoir 3 to the brake cylinder 4 substantially in the manner hereinbefore described.

Upon the reduction in fluid pressure at an emergency rate in the chamber 53 of the emergency valve device 5, the pressure of the fluid in the valve chamber 56 becomes effective to move the emergency piston 52 toward the right, as viewed in the drawings, the movement of the emergency piston now being quicker than the service movement thereof already described due to the greater differential in the opposing pressures acting on said piston.

In the initial movement of the emergency piston 52 toward emergency position, the piston through the medium of the stem 57 shifts the auxiliary slide valve 61 relative to the emergency slide valve 60 so as to cause the cavity 100 in the auxiliary slide valve to register with the port 95 and establishes communication between a passage 116, which is connected to the cavity 100, and a port 117 in the emergency slide valve. As hereinbefore described in connection with the quick service operation of the invention, this initial movement of the auxiliary slide valve 61 also causes the port 94 therein to connect the ports 93 and 105 in the emergency slide valve 60, thereby momentarily establishing communication from the brake pipe 2 to the quick service chamber 78 for effecting an initial local venting of fluid under pressure from said brake pipe.

At the same time, the restricted passage 103 in the auxiliary slide valve is brought into registration with the port 99 in the emergency slide valve 60. It will be understood, however, that because of the continued rapid movement of the emergency piston 52 toward emergency position following the sudden reduction in brake pipe pressure at the emergency rate, said piston moves the stem 57 to cause engagement of the shoulder 58 thereof with the emergency slide valve 60 and immediately shifts both slide valves to the right, compressing the spring 73, and thereby lapping the port 99 so that during this movement any venting of fluid under pressure from the valve chamber 56 by way of the restricted port 103 and port 99 will not be appreciable.

The ports 117 and 95 in the emergency slide valve, which are now connected by way of the cavity 100 and passage 116 in the auxiliary slide valve, are so proportioned and arranged that, as the slide valves approach the emergency position, the port 117 registers with a branch 106a of passage 106, while the port 95 registers with the passage 92, thereby effecting the further venting of fluid under pressure from the brake pipe 2 by way of the passage 106 communicating therewith, through the branch passage 106a, port 117, passage 116, cavity 100, port 93 and passage and pipe 92 to the quick service chamber 78. Final movement of the emergency piston 52 into emergency position in which the piston engages the gasket 44 then causes the emergency slide valve 60 to cut off the communication between the port 117 and branch passage 106a.

With the parts of the emergency valve device 5 in the emergency position, the cavity 89 in the emergency slide valve 60 is adapted to register with the passages 86 and 88, so as to effect the supply of fluid under pressure from the emergency reservoir 76 through the pipe 87, passage 86, cavity 89, and passage and pipe 88 to the emergency brake cylinder 6, thereby effecting an emergency application of the brakes.

In addition, in the emergency position of the emergency slide valve 60, the passage 65 therein registers with the passage 98 in the casing for permitting fluid under pressure in the valve chamber 56 to flow through the passage 64, past the check valve 67 and through the chamber 63, passage 65 and passage and pipe 98 to the stabilizing bulb 77. The fluid pressure in the valve chamber 56 is thus partially reduced for facilitating subsequent release movement of the piston 52.

To effect the release of the brakes after an emergency application, the brake pipe is again charged with fluid under pressure, thereby causing the triple valve parts to move to release position for venting fluid under pressure from the brake cylinder 4 in the usual manner. Similarly, the increase in brake pipe pressure causes the emergency piston 52 to return the associated slide valves to the release position, as shown in Fig. 1 of the drawings, for venting the fluid under pressure in the emergency brake cylinder 6 to atmosphere in the manner already described, it being understood that this movement of the emergency valve elements mentioned is readily accomplished by reason of the reduced fluid pressure in the valve chamber 56.

It will be apparent from the foregoing that, if it is desired to effect an emergency application of the brakes immediately after a service application has already been made, upon the further venting of fluid under pressure from the brake pipe 2 at an emergency rate, as effected in the usual manner, the pressure of the fluid in the valve chamber 56 will be sufficient to move the emergency piston 52 from the service position to the emergency position. The emergency reservoir 76 having thereby been connected to the emergency brake cylinder 6, a full emergency application will be effected in the manner hereinbefore described. Emergency operation of the brakes is thus always available with fluid pressure brake apparatus constructed according to the invention.

Referring to Fig. 2 of the drawings, there is illustrated a modified form of the device shown in Fig. 1, in which means is provided whereby the separate emergency brake cylinder may be dispensed with, and the usual brake cylinder adapted for effecting an emergency application of the brakes under a higher fluid pressure than that required for effecting a service application. As shown in Fig. 2, the casing section 10 of the triple valve device 1 is provided with a passage 120, which is open through the chamber 28 and passage 29 to the brake cylinder 4, and which communicates by way of a pipe 121 with a port 122 in the seat of the emergency slide valve 60 in the emergency valve device 5.

In the release position of the apparatus, as shown in Fig. 2, the emergency slide valve 60 is positioned so as to lap the passage 122, while the brake cylinder is connected to the atmosphere by way of the usual passages and ports in the triple valve device 1 as shown in Fig. 1 of the drawings.

When the slide valve 60 is moved to the emergency position in the manner hereinbefore described, the cavity 89 is adapted to connect the port 122 with the port 86, thereby permitting fluid under pressure to flow from the emergency reservoir by way of the pipe 87, passage 86, cavity 89, passage 122 and pipe 121 to the chamber 28 in the triple valve casing 9, and thence through the passage 29 to the usual brake cylinder, which is at the same time supplied with fluid under pressure from the usual auxiliary reservoir by operation of the triple valve device 1 in the well known manner. As a result of the equalization of the fluid pressures in both the auxiliary reservoir and emergency reservoirs and the brake cylinder, a relatively high braking force will be produced, effecting the desired emergency application of the brakes.

According to the modified form of my invention shown in Fig. 3 of the drawings, there is provided, in addition to the triple valve device 1, a casing section 125, an emergency valve device 126, and a unitary emergency reservoir 127, release ensuring bulb 128 and quick service chamber 129.

The casing section 125 has a clamping face 131 adapted to be secured to the flange 37 of the triple valve device 1 by means of bolts (not shown), a gasket 42 being interposed between said clamping face and flange. Formed within the casing section is a chamber 133 which communicates with the passage 40 of the triple valve device 1, and which is also open by way of an aperture 134 to the piston chamber 13 in the triple valve device. For limiting movement of the usual piston in the triple valve device 1 beyond its service position, a stem 135, similar to the abutment 45 shown in Fig. 1 is mounted within the casing section 125 and projects into the piston chamber 13 of the triple valve device 1.

The emergency valve device 126 comprises a casing having a face 137 which is adapted to be secured to a flange 138 of the casing section 125. A gasket 139 is interposed between the flange 138 and the flange 137 for providing a sealed joint. Mounted in the casing of the emergency valve device 126 is a service piston 141, which has at one side a piston chamber 142 connected through an aperture 143 with the chamber 133 in the casing section 125, and which has at the other side a valve chamber 144 open by way of a passage 145 to a volume chamber 146 that is formed in the emergency valve casing.

Contained in the valve chamber 144 is a service slide valve 148, which is adapted to be operated by the service piston 141 through the medium of a stem 149 having a suitable recess 150 adapted to receive the slide valve. Formed within the service slide valve 148 is a check valve chamber 152 communicating through a passage 153 with the slide valve chamber 144 and connected to a slide valve port 154. A ball check valve 156 is disposed in the chamber 152 for preventing back flow therefrom through the passage 153 to the slide valve chamber 144, and a plug 157 is screwed into the slide valve 148 for closing the upper end of said check valve chamber.

A spring 159 is provided in a cap nut 160 having screw threaded engagement with the casing of the emergency valve device 126 for closing the outer end of the valve chamber 144, which spring is engageable by a collar 161 formed adjacent the end of the valve stem 149 for yieldably resisting movement thereof to a retarded charging position. For resisting undesired movement of the piston 141 to the service position by slight fluctuations in brake pipe pressure, there is provided a plunger 162, which is similar to the plunger 70 shown in Fig. 1 and already described, the plunger 162 being aligned with the piston 141 and slidably mounted in a cage 163 carried within the casing section 125. A stabilizing spring 164 fitted in the cage 163 is adapted to urge the plunger 162 to the position shown in Fig. 3.

An emergency slide valve 167 and an auxiliary slide valve 168 are mounted in a valve chamber 166 formed in the casing, which chamber communicates by way of a passage 170 and a pipe 170a with the reservoir 127. The slide valves 167 and 168 are adapted to be operated through the medium of a stem 169 by a movable abutment comprising a small piston head 171 and a large piston head 172 formed integral with the piston head 171. The auxiliary slide valve 168 is fitted within a recess 173 formed in the stem 169 and is adapted for movement relative to the emergency slide valve 167, which is arranged to be operatively engaged by either one of a pair of lugs 174 and 175 formed on the piston stem.

The piston head 172 is subject to the pressure of fluid in a piston chamber 176 open through an aperture 177 to the chamber 133 in the casing section 125 and thus to the brake pipe. The small piston head 171 is of hollow form and is slidably mounted in a countersunk bore provided in the emergency valve casing adjacent the piston chamber 176, the chamber 179 formed between the piston heads 171 and 172 being connected to the atmosphere by way of a port 180.

In operation, fluid under pressure is supplied to the brake pipe and thence by way of the passage 40 to the chamber 133 in the well known manner. Fluid under pressure flows from the chamber 133 through the aperture 134 to the triple valve piston chamber 13 and moves the parts of the triple valve device 1 to release position in the manner already described.

Fluid under pressure thus supplied to the chamber 133 also flows through the aperture 177 to the piston chamber 176 and acts to urge the emergency piston head 172 into engagement with a shoulder 178 formed adjacent the chamber 179, the stem 169 and slide valves 168 and 167 being thereby maintained in the release position as shown in Fig. 3 of the drawings. At the same time fluid under pressure is supplied from the chamber 133 through the aperture 143 to the piston chamber 142 and moves the service piston 141, stem 149 and service slide valve 148 to the left, thereby causing the piston 141 to uncover a feed groove 182 through which fluid under pressure then flows to the valve chamber 144 and volume chamber 146 connected thereto.

On cars near the head end of the train, the relatively fast rate of increase in fluid pressure in the brake pipe and consequently in the piston chamber 142 causes the piston 141 to move into the retarded charging position wherein said piston engages a stop 183 formed on the casing, the collar 161 on the stem 149 being thereby moved to compress the spring 159 while the service slide valve 148 is so positioned that the port 154 therein is in partial registration with the passage 170. With the service slide valve in this position, fluid under pressure is supplied at a restricted rate from the valve chamber 144 through the passage 153 in the slide valve, past the ball check valve 156, through the port 154, and passage 170 to the emergency valve chamber 166, and by way of the pipe 170a to the emergency reservoir 127. The charging of the emergency reservoirs on the forward cars will thus be effected at a relatively slow rate so as to permit the uniform charging of the reservoirs on cars at the rear of the train, where the increase in brake pipe pressure is otherwise apt to be unduly delayed.

If the build-up in brake pipe pressure is at a moderate rate, as is the case at cars located near the rear of the train, the fluid pressure in the piston chamber 142 of the emergency valve device 126 moves the service piston 141 and slide valve 148 to the release position as shown in Fig. 3 of the drawings. With the service slide valve in the release position, the port 154 is in full registration with the passage 170, so as to permit charging of the emergency reservoir 127 at the maximum rate.

In either the retarded recharging position or release position of the service slide valve 148, the bulb 128 is connected by way of a pipe and passage 185, a cavity 186 in said slide valve, and an exhaust port 187 to the atmosphere, while the quick service chamber 129 is similarly connected to the atmosphere by way of a pipe and passage 188, a cavity 189 in the service slide valve and an atmospheric exhaust port 190.

If fluid under pressure is vented at a service rate from the brake pipe and the connected chambers 133, 13, 142 and 176 in order to effect a service application of the brakes, the triple valve device 1 is operated in the usual manner to supply fluid under pressure to the brake cylinder, while the reduction in the pressure of fluid in the piston chamber 142 in the emergency valve device 126 permits the fluid under pressure in the valve chamber 144, augmented by that in the connected volume chamber 146, to move the service piston 141 to the right.

In so moving the service piston first closes the feed groove 182 and operates the service slide valve 148 through the medium of the stem 149 so as to cut off communication between the port 154 and passage 170. Continued movement of the service piston 141 brings the piston into engagement with the plunger 162 which is then moved against the force of the stabilizing spring 164 to permit the piston to move the service slide valve 148 into the service position. This movement of the service slide valve 148 causes the cavity 189 to connect the passage 188 with a passage 192 communicating with the chamber 133, whereupon fluid under pressure is vented from the brake pipe by way of the passage 40, chamber 133, passage 192, cavity 189, and passage and pipe 188 to the quick service chamber 129, thereby effecting a local quick service reduction in brake pipe pressure for propagating the service reduction.

In addition, with the service slide valve 148 in service position, the pressure of fluid in the connected valve chamber 144 and volume chamber 146 is reduced by flow of fluid from the valve chamber through a port 193 in the service slide valve, and passage and pipe 185 to the bulb 128, so as to render the service piston 141 readily operable to release position upon a subsequent increase in brake pipe pressure in effecting the release of the brakes.

While the service piston and slide valve are operated in the manner just described upon a reduction in brake pipe pressure at a service rate, the reduction in the fluid pressure effected in the emergency piston chamber 176 is not sufficient to permit the pressure of fluid in the emergency valve chamber 166 acting on the small piston head 171 to overcome the reduced fluid pressure acting on the large piston head 172, so that the auxiliary and emergency slide valves 168 and 167 are maintained in their release position.

It will thus be apparent that so long as the pressure of fluid in the brake pipe is not reduced below a predetermined value, the emergency valve device 126, as well as the triple valve device 1, will not be operative to effect an emergency application of the brakes, so that any tendency of the brake controlling valve devices to effect an undesired emergency application of the brakes is avoided.

To effect the release of the brakes following a service application, fluid under pressure is again supplied to the brake pipe and through the passage 40 and chamber 133 to the piston chamber 13 in the triple valve device 1 and the piston chamber 142 in the emergency valve device 126. The triple valve device 1 is thereby operated in the manner described to release fluid under pressure from the usual brake cylinder, while the emergency piston 141 and slide valve 148 are moved to either the retarded charging position or the release position illustrated in Fig. 3, depending upon the location of the emergency valve device in the train as hereinbefore explained. It will be understood that the service piston 141 is quickly responsive to the increase in fluid pressure effected in the piston chamber 142 as above stated, because of the previously reduced fluid pressure acting in the valve chamber 144.

If fluid under pressure is vented from the brake pipe at an emergency rate for effecting an emergency application of the brakes, the consequent reduction in fluid pressure at the same rate in the chamber 133 and in the piston chamber 13 of the triple valve device 1 and service piston chamber 142 in the emergency valve device 126 effects operation of the triple valve device and of the service piston 141 and service slide valve 148 in the manner already explained in the foregoing description of the operation of said devices to effect a service brake application.

As a result of the heavy reduction in brake pipe pressure thus effected, the pressure of fluid in the emergency piston chamber 176 in the emergency valve device 126 falls below the predetermined pressure required to maintain the emergency piston head 172 in the release position, and the opposing fluid pressure acting on the small piston head 171 in the valve chamber 166 is then enabled to move the emergency piston and stem 169 to the right. In so moving the stem 169 first shifts the auxiliary slide valve 168 relative to the emergency slide valve 167, causing a cavity 194 in the auxiliary slide valve to register with ports 195 and 196 in said emergency slide valve.

Continued movement of the stem 169 at the same time brings the lug 174 thereon into engagement with the emergency slide valve 167, which is thereafter moved with the auxiliary slide valve 168 toward emergency position. As the slide valves 167 and 168 thus approach the emergency position, the port 195 is caused to register with an atmospheric exhaust port 197 and 196 is then brought into registration with a passage 198 communicating with the chamber 133.

While the above communications are maintained as just described, fluid under pressure is locally vented from the brake pipe through the chamber 133, passage 198, port 196, cavity 194, port 195 and the atmospheric exhaust port 197, thereby effecting a local reduction in brake pipe pressure for augmenting the reduction already made so as to ensure rapid serial quick action operation of all the brake controlling valve devices throughout the train.

The fluid pressure acting on the piston head 171 finally moves the piston head 172 into engagement with the gasket 139, the slide valves being then positioned in full emergency position, in which the atmospheric exhaust port 197 is lapped so that further venting of fluid under pressure from the brake pipe is prevented. This final movement of the emergency slide valve 167 also establishes communication between the valve chamber 166 and a brake cylinder passage 199, which is connected through a pipe 200 to either an emergency brake cylinder such as that shown in Fig. 1 of the drawings or to the usual brake cylinder in the manner disclosed in Fig. 2.

With the emergency slide valve 167 in full emergency position, fluid under pressure is supplied from the emergency reservoir 127 by way of the pipe 170a, passage 170, which is, of course, now lapped at its upper end by the service slide valve 148, and thence through the valve chamber 166, passage 199 and pipe 200 to the brake cylinder, thereby effecting an emergency application of the brakes.

To effect a release of the brakes after an emergency application, fluid under pressure is again supplied to the brake pipe, the elements of the triple valve device 1 and the service piston 141 in the emergency valve device 126 being then returned to the release position as hereinbefore described. Similarly, the increase in fluid pressure in the emergency piston chamber 176 resulting from the increase in brake pipe pressure causes the piston head 172 to move the stem 169 to the left, thereby shifting the auxiliary slide valve 168 relative to the emergency slide valve 167 to cut off communication between the cavity 194 and port 196. The lug 175 on the stem 169 then engages the main slide valve 167, and as the piston head 172 continues movement toward the left-hand, the stem then shifts both the emergency and auxiliary slide valves to the release position as shown in Fig. 3, in which position the brake cylinder passage 199 is lapped. Further movement is prevented upon engagement of the piston head 172 with the shoulder 178.

It will be apparent from the foregoing description that my invention may be applied to existing brake equipment without alteration of the usual triple valve device, so as to provide means for effecting the service application of the brakes quickly and uniformly throughout the train to prevent harsh slack action, and that the invention further provides improved means operative only upon a predetermined degree of reduction in brake pipe pressure to effect an emergency application of the brakes, the emergency function being available after, as well as prior to, the making of a service application.

While several illustrative embodiments of the invention have been described in detail, it is not my intention to limit its scope to these embodiments or otherwwise than by the terms of the appended claims.

Having now described my invention, what I claim as new and desire to secure by Letters Patent, is:

1. In a fluid pressure brake, in combination, a brake pipe, a brake controlling valve device operative upon a service rate of reduction in brake pipe pressure to effect a service application of the brakes and provided with means for effecting a local reduction in brake pipe pressure upon movement of the valve device to effect a service application of the brakes, and an emergency valve device comprising fluid pressure responsive means operative upon a service rate of reduction in brake pipe pressure to vent fluid under pressure locally from the brake pipe and operative upon an emergency reduction in brake pipe pressure for effecting an emergency application of the brakes.

2. In a fluid pressure brake, in combination, a brake pipe, a brake controlling valve device operative upon a service rate of reduction in brake pipe pressure to effect a service application of the brakes, and an emergency valve device comprising a movable abutment subject to the opposing pressures of fluid in the brake pipe and a chamber, valve means operative by said abutment upon a reduction in brake pipe pressure at a service rate for locally venting fluid under pressure from the brake pipe and upon an emergency reduction in brake pipe pressure for effecting an emergency application of the brakes, and means for equalizing the fluid pressure in said chamber with that in a vent chamber when said valve means is in service position, whereby further movement of said valve means may be checked and subsequent release operation thereof facilitated.

3. In a fluid pressure brake, in combination, a brake pipe, a brake controlling valve device comprising fluid pressure responsive means subject to the opposing pressures of fluid in the brake pipe and the fluid in a chamber, said fluid pressure responsive means being movable to one position upon a reduction in brake pipe pressure at a gradual rate and to emergency application position upon a reduction in brake pipe pressure at an emergency rate for effecting an emergency application of the brakes and to a release position upon an increase in brake pipe pressure for effecting the release of the brakes, and means for establishing communication from said chamber to a vent chamber when said fluid pressure responsive means is moved to said first mentioned position, whereby the pressure of the fluid in said chamber is reduced on the one hand for facilitating movement of said fluid pressure responsive means to release position, while on the other hand remaining sufficient to move said fluid pressure responsive means to emergency position upon a further reduction in brake pipe pressure at an emergency rate.

4. In a fluid pressure brake, in combination, a brake pipe, means operative upon a service rate of reduction in brake pipe pressure to effect a service application of the brakes, a brake cylinder, an emergency reservoir, and an emergency valve device comprising valve means subject to the opposing pressures of fluid in the brake pipe and a chamber and movable to a service position upon a reduction in brake pipe pressure at a service rate for venting fluid under pressure from the brake pipe and to an emergency position upon a reduction in brake pipe pressure at an emergency rate to establish communication from said reservoir to said brake cylinder, and means for equalizing the fluid pressure in said chamber with that in a vent chamber upon movement of said valve means to service position and also upon movement of said valve means to emergency position, whereby sufficient fluid pressure is retained in said chamber to prevent movement of said valve means to release position prior to a predetermined increase in brake pipe pressure.

5. In a fluid pressure brake, the combination with a brake pipe and means operative upon a service rate of reduction in brake pipe pressure to effect a service application of the brakes, of a movable abutment subject to the opposing pressures of the brake pipe and a valve chamber, and valve means operative by said abutment upon a service rate of reduction in brake pipe pressure for venting fluid from said valve chamber to a vent chamber and from the brake pipe to a quick service chamber, and upon an emergency reduction in brake pipe pressure for venting fluid from said valve chamber to said vent chamber while effecting an emergency application of the brakes.

6. In a fluid pressure brake, the combination with a brake pipe and means operative upon a service rate of reduction in brake pipe pressure to effect a service application of the brakes, of an emergency valve device comprising a movable abutment subject to the opposing pressures of fluid in the brake pipe and a valve chamber, valve means operative by said abutment upon a reduction in brake pipe pressure at either a service or emergency rate to vent fluid under pressure from the brake pipe to a quick service chamber and to vent fluid under pressure from said valve chamber to a vent chamber, a second movable abutment subject to the opposing pressures of fluid in the brake pipe and in a chamber, and valve means operative by the last named abutment upon an emergency reduction in brake pipe pressure to a predetermined value to vent fluid under pressure from the brake pipe to the atmosphere and to effect an emergency application of the brakes.

7. In a fluid pressure brake, in combination, a brake pipe, means operative upon a service rate of reduction in brake pipe pressure to effect a service application of the brakes, a brake cylinder, an emergency reservoir, and an emergency valve device comprising a movable abutment subject to the opposing pressures of fluid in the brake pipe and a valve chamber, valve means having a release position for supplying fluid under pressure from the brake pipe to the reservoir and movable by said abutment upon a service or emergency rate of reduction in brake pipe pressure to a service position for venting fluid from the brake pipe to a quick service chamber and from said valve chamber to a vent chamber, a second movable abutment subject to the opposing pressures of fluid in the brake pipe and said reservoir, and valve means operative by the last named abutment upon an emergency reduction in brake pipe pressure below a predetermined value to vent fluid under pressure from the brake pipe to atmosphere and to supply fluid under pressure from said reservoir to the brake cylinder for effecting an emergency application of the brakes.

8. In a fluid pressure brake, in combination, a brake pipe, a brake cylinder, an emergency reservoir, a brake controlling valve device operative upon a service reduction in brake pipe pressure to effect a service application of the brakes, and an emergency valve device comprising a casing having a chamber adapted to be supplied with fluid under pressure from the brake pipe, a movable abutment subject to the opposing pressures of fluid in the brake pipe and in said chamber, and valve means having a release position for supplying fluid under pressure from said chamber to said reservoir and operable by said abutment to a service position in which fluid under pressure is vented from said chamber, and to emergency position for cutting off communication between the chamber and reservoir while supplying fluid under pressure from said reservoir to the brake cylinder, said valve means including a slide valve having a port through which fluid under pressure is supplied from the chamber to the reservoir for charging said reservoir when said valve means is in release position, and a ball check valve in said port for preventing back flow of fluid under pressure to said chamber.

9. In a fluid pressure brake, in combination, a brake pipe, a brake cylinder, an auxiliary reservoir, a brake controlling valve device operative upon a service rate of reduction in brake pipe pressure to supply fluid under pressure from said auxiliary reservoir to said brake cylinder in effecting a service application of the brakes, an emergency reservoir, and an emergency valve device comprising a movable abutment having differential areas, the larger area being subject to brake pipe pressure and the smaller area being subject to the pressure of fluid in the emergency reservoir, and valve means operative by said movable abutment upon a reduction in brake pipe pressure below a predetermined value to supply fluid under pressure from said emergency reservoir to said brake cylinder.

10. In a fluid pressure brake, in combination, a brake pipe, a brake cylinder, an auxiliary reservoir, a brake controlling valve device operative upon a service rate of reduction in brake pipe pressure to supply fluid under pressure from said auxiliary reservoir to said brake cylinder in effecting a service application of the brakes, an emergency reservoir and an emergency valve device comprising service valve means adapted to control the supply of fluid under pressure from said brake pipe to said emergency reservoir, a movable abutment having differential areas, the larger area being subject to brake pipe pressure and the smaller area being subject to the pressure of fluid in the emergency reservoir, and valve means operative by said movable abutment upon a reduction in brake pipe pressure below a predetermined value to supply fluid under pressure from said emergency reservoir to said brake cylinder.

11. In a fluid pressure brake, in combination, a brake pipe, an auxiliary reservoir, a brake cylinder, a brake controlling valve device operative upon a service rate of reduction in brake pipe pressure to supply fluid under pressure from said auxiliary reservoir to said brake cylinder for effecting a service application of the brakes and operative upon an increase in brake pipe pressure to effect the release of fluid under pressure from said brake cylinder, an emergency reservoir, and an emergency valve device operative upon a service reduction in brake pipe pressure to vent fluid under pressure from said brake pipe to a quick service chamber and upon a reduction in brake pipe pressure below a predetermined value to supply fluid under pressure from said emergency reservoir to said brake cylinder.

12. In a fluid pressure brake, in combination, a brake pipe, a brake cylinder, a reservoir, and a brake controlling valve device comprising a movable abutment subject to the opposing pressures of fluid in the brake pipe and in a chamber and valve means movable by said abutment upon a reduction in brake pipe pressure to a brake application position for establishing a communication through which fluid under pressure is supplied from said reservoir to the brake cylinder, and means for equalizing the fluid pressure in said chamber with that in a vent chamber upon movement of said valve device to the application position, whereby sufficient pressure is retained in said chamber to prevent movement of said valve device to release position unless the brake pipe pressure is increased to a predetermined degree.

13. In a fluid pressure brake, the combination with a brake pipe and means operative upon a service rate of reduction in brake pipe pressure to effect a service application of the brakes, of a movable abutment subject to the opposing pressures of the brake pipe and a valve chamber, and valve means operative by said abutment upon a service rate of reduction in brake pipe pressure for venting fluid from said valve chamber and from the brake pipe, and upon an emergency reduction in brake pipe pressure for venting fluid from said valve chamber while effecting an emergency application of the brakes.

14. In a fluid pressure brake, the combination with a brake pipe and means operative upon a service rate of reduction in brake pipe pressure to effect a service application of the brakes, of an emergency valve device comprising a movable abutment subject to the opposing pressures of fluid in the brake pipe and a valve chamber, valve means operative by said abutment upon a reduction in brake pipe pressure at either a service or emergency rate to vent fluid under pressure from the brake pipe and from said valve chamber, a second movable abutment subject to the opposing pressures of fluid in the brake pipe and in a chamber, and valve means operative by the last named abutment upon an emergency reduction in brake pipe pressure to vent fluid under pressure from the brake pipe to the atmosphere and to effect an emergency application of the brakes.

15. In a fluid pressure brake, in combination, a brake pipe, a brake cylinder, an auxiliary reservoir, a brake controlling valve device operative upon a service rate of reduction in brake pipe pressure to supply fluid under pressure from said auxiliary reservoir to said brake cylinder in effecting a service application of the brakes, an emergency reservoir, and an emergency valve device comprising a movable abutment having differential areas, the larger area being subject to brake pipe pressure and the smaller area being subject to the pressure of fluid in the emergency reservoir, and valve means operative by said movable abutment upon a reduction in brake pipe pressure below a predetermined value to supply fluid under pressure from said emergency reservoir to said brake cylinder and to vent fluid under pressure from said brake pipe to the atmosphere.

16. In a fluid pressure brake, in combination, a brake pipe, a brake cylinder, a reservoir, and a brake controlling valve device comprising a movable abutment subject to the opposing pressures of fluid in the brake pipe and a valve chamber adapted to be supplied with fluid under pressure from said brake pipe, and valve means operative by said abutment from a release position to a service position in which fluid under pressure is vented from said chamber and to an application position in which fluid under pressure is supplied from the reservoir to the brake cylinder, said valve means including a slide valve having a passage and positioned in the release position of said valve means so that fluid under pressure is supplied from said chamber through the passage to said reservoir, and means for preventing back flow of fluid under pressure from said reservoir through said passage to said chamber.

FREMONT P. LIVINGSTON.